Oct. 7, 1969 J. A. BAUMAN ET AL 3,470,589
MEANS FOR SECURING CLAMPING RINGS
Filed Dec. 8, 1967 2 Sheets-Sheet 1

INVENTORS
JOHN A. BAUMAN
JAMES O. BENDER
BY PENDLETON, NEUMAN
SEIBOLD & WILLIAMS
ATTORNEYS

Oct. 7, 1969   J. A. BAUMAN ET AL   3,470,589
MEANS FOR SECURING CLAMPING RINGS
Filed Dec. 8, 1967   2 Sheets-Sheet 2
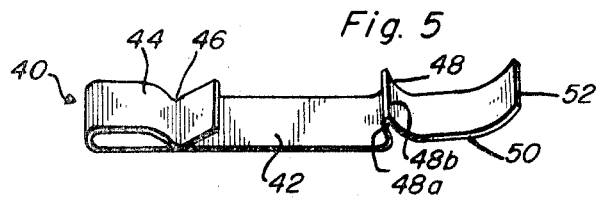
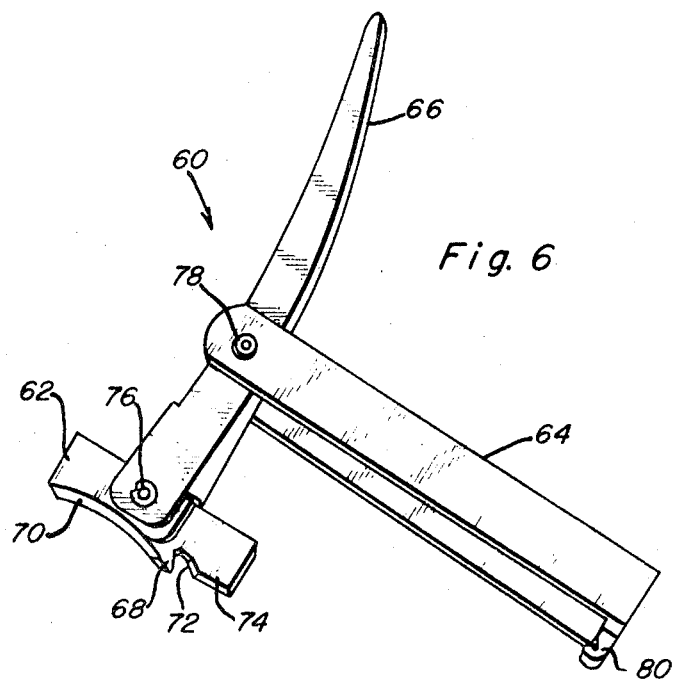
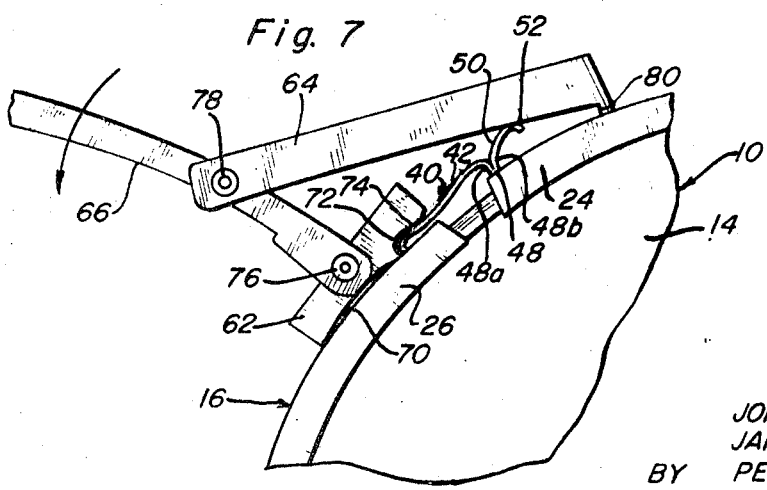
INVENTORS
JOHN A. BAUMAN
JAMES O. BENDER
BY PENDLETON, NEUMAN
SEIBOLD & WILLIAMS
ATTORNEYS United States Patent Office 3,470,589
Patented Oct. 7, 1969

3,470,589
MEANS FOR SECURING CLAMPING RINGS
John A. Bauman, Harvey, and James O. Bender, South Holland, Ill., assignors to Rings Incorporated, Thornton, Ill., a corporation of Illinois
Filed Dec. 8, 1967, Ser. No. 689,049
Int. Cl. B65d 63/06
U.S. Cl. 24—23                               6 Claims

ABSTRACT OF THE DISCLOSURE

A unitary spring clip is provided with a hook at one end extending through an opening adjacent a first end of a clamping ring and engaging the ring, and a tab near the opposite end of the clip to extend into an opening near the second end of the ring. The tab comprises a reverse bent extension of the clip body disposed at an acute angle to the portion of the body between the hook end and the tab. A tool for contracting the ring and applying the clip includes a lever to urge the tab into the opening in the second end of the ring as force is applied to draw the ring ends together.

BACKGROUND OF THE INVENTION

Field of the invention

This invention pertains to clamping rings for securing closure members to the ends of drums, casks, buckets or similar containers and more particularly to securing the ends of such clamping rings with clips.

Description of the prior art

The application of a split clamping ring requires drawing the ring ends together to contract the ring, whereby the ring draws a cover into closure relation with the chime of a container, and requires providing for securing the ring ends in the clamping position. The arrangement for securing the ends of the ring must provide reliable securement and should provide for closure and securement of the ring in a simple operation. Also it should provide a telltale arrangement to indicate unauthorized opening of the container. It is highly desirable to minimize the extension or protrusion of the securement device beyond the periphery of the container and to minimize the cost of fabricating and applying such rings.

The prior art has included many different toggle, or overcenter type latches. However, such latches require a complete toggle assembly for each ring, usually with a keeper or shroud, thereby adding significantly to the cost of each ring assembly due to the cost of the toggle mechanism and the cost of its fabrication and application to the ring. Other proposed devices have included extensions or tabs integral with or affixed to one end of the ring for latching engagement with the opposite end. However, with these latter arrangements the ring is expended whenever the securing device is broken, or a welding or similar securement operation is required to affix the extension or tab device to the ring.

SUMMARY OF THE INVENTION

It is an object of this invention to provide improved means for applying and securing clamping rings on containers.

It is a further object of this invention to provide economical means for securing the ends of clamping rings and which will provide reliable securement of the rings with minimum extension of the devices beyond the periphery of the containers.

It is a further object of this invention to provide a securing device which may be applied and/or replaced conveniently and economically, and to provide improved tools for applying and securing clamping rings.

In general the foregoing objects of this invention are achieved in one embodiment by providing a clamping ring assembly including a spring clip having a hook at one end clipped to the first end of a split clamping ring and with the clip extending toward the second end of the ring, the clip having a reverse bent portion adjacent its other end forming a tab extending laterally from the body portion of the clip, and a cooperative opening in the second end of the clamping ring to receive said tab.

For a more complete understanding of this invention, reference should now be had to the embodiment illustrated in greater detail in the accompanying drawings and described below by way of an example of the invention.

BRIEF DESCRIPTION OF THE DRAWINGS

FIG. 5 is an enlarged perspective view of the clip of the assembly in FIG. 1;

FIG. 6 is a perspective view of a tool for contracting a clamping ring and latching a clip in the assembly of FIG. 1, and FIG. 7 is a partial plan view illustrating the tool of FIG. 6 being used to contract a clamping ring and latch a clip in an assembly as in FIG. 1.

DESCRIPTION

Figure 1:
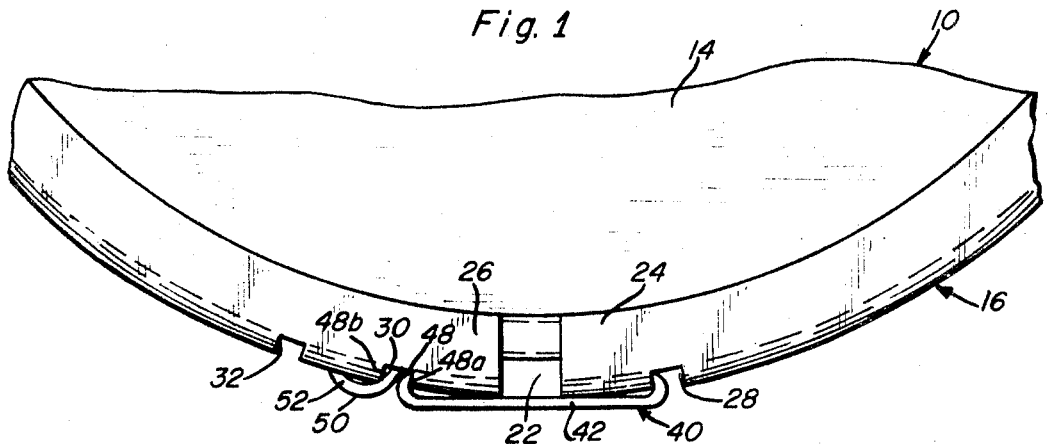
FIG. 1 is a partial plan view of a container and a clamping ring assembly employing teachings of this invention.
Figure 2:
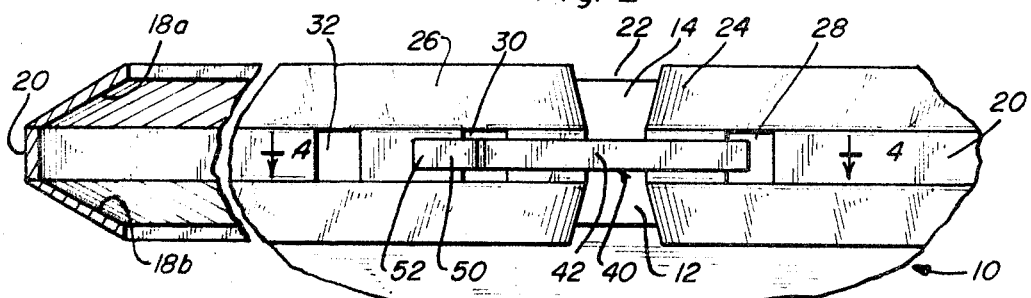
FIG. 2 is an elevation view, partially in section, of the container and clamping ring assembly shown in FIG. 1.

Referring to FIGS. 1 and 2, there is illustrated generally a portion of a container 10 having a chime 12 and a removable cover 14, with the cover being clamped in closure relation with the chime by a clamping ring 16. A gasket (not shown) may be interposed between the chime and the cover if desired. As best illustrated in FIG. 2, the clamping ring 16 may be of a cross section to provide opposed inclined cam surfaces as at 18a and 18b for drawing the cover into sealing engagement with the chime 12. The illustrated ring 16 also includes a central peripheral portion 20 defining a band concentric with and generally parallel to the side wall of container 10. It will be appreciated that the ring may be of other cross sections, e.g. arcuate or rectangular.

Figure 3:
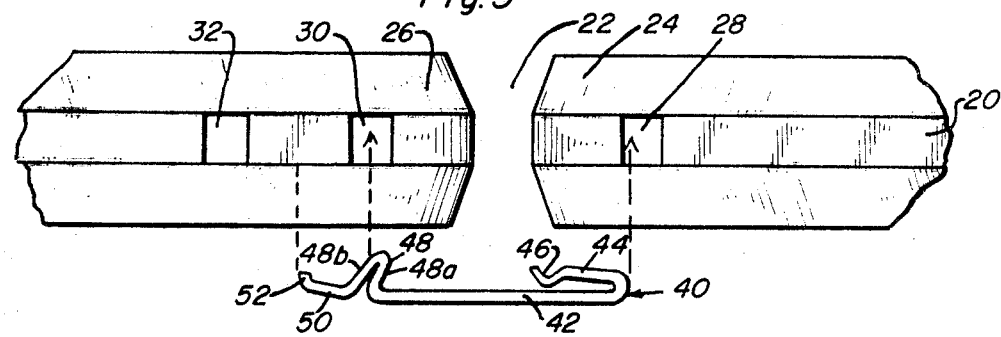
FIG. 3 is another view of the elements of the clamping ring assembly of FIG. 2.
Figure 4:
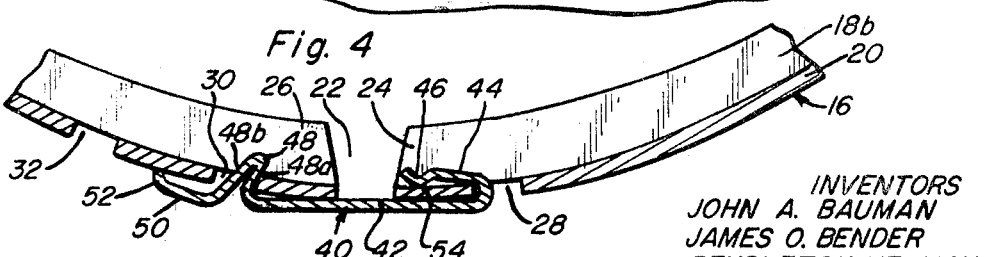
FIG. 4 is a partial cross-sectional view of the clamping ring assembly taken along line 4—4 of FIG. 2 and looking in the direction of the arrows.

Referring also to FIGS. 3 and 4, the ring 16 is a split ring, that is, it extends over a complete circle except for the space or opening 22 between the ends 24 and 26. An opening 28 is provided through band 20 adjacent end 24, and a pair of spaced similar openings 30 and 32 are provided in the band 20 adjacent the end 26.

A unitary clip 40 (see also FIG. 5) preferably is formed of spring steel and is adapted to engage in openings 28 and 30 to secure the ring 16 in its contracted clamping position as illustrated in FIGS. 1, 2 and 4. The clip 40 includes a main body portion 42, an end portion 44 generally parallel to the main body portion and defining a generally J-configuration therewith, note FIGS. 3 and 4. A detent bend 46, adjacent the distal end of portion 44, extends toward the main body portion 42 for clamping engagement with band 20 to retain the clip on the clamping ring 16. A reverse bent tab section 48 extends laterally of the body portion 42 at the end thereof opposite the portion 44, and a tail section 50 extends from tab 48, terminating in an inwardly curved portion 52 at its distal end. The inner face of the tab 48, at 48a, extends at an acute angle, on the order of about 45° to 75°, with respect to the plane of the inner surface of the adjacent portion of body 42, for purposes to be described. Tab 48 also may be shallowly curved to form a shallow hook of face 48a, if desired.

Referring particularly to FIG. 4, the clip 40 is mounted on end portion 24 of the ring by inserting end portion 44 through opening 28 whereby the detent 46 engages the inner surface of band 20, as at 54. The clip thereby is supported with the main body portion extending beyond end portion 24, toward end portion 26, and the clip may be mounted on the ring in this manner prior to shipment of the rings to the user, if desired. The grip of the J-shaped section on the interposed section of band 20 is adequate to retain the clip in this position during such shipment. The ring with a clip on end 24 as aforenoted is contracted about a chime and cover until the tab 48 is aligned with opening 30. Thereupon the tab 48 is inserted into this opening to secure the ring in its contracted clamping position. Reliable securement is assured by the acute angular relation of the inner surface of the tab 48 with respect to the body 42.

The cross-sectional configuration of the ring 16, with respect to the dimensions of the chime 12 and cover 14, are such that there is adequate clearance between the inner surface of band 20 and the outer periphery of the chime to accommodate clip portion 44 and for the extension of tab 48 through opening 30. Alternatively, the ring may be enlarged slightly in diameter at the end portions 24 and 26, that is the end portions 24 and 26 may be offset slightly radially outward to accommodate portion 44 and tab 48 if it is desired that the remainder of the ring fit closely or be in contact with the outer periphery of the chime and the cover.

It will be appreciated that a plurality of openings 30 may be provided in the end portion 26 for selective engagement by the tab 48 in instances where variations may be encountered in the circumference of the containers and/or where varying degrees of clamping or sealing of the cover may be desired.

The tail 50 provides easy access for insertion thereunder of a screw driver, nail or similar instrument for prying outward thereon to dislodge the tab 48 from the opening 30 when it is desired to remove the ring. An outward force thus applied to the tail 50, coupled with the resistance of the tab to outward movement due to the frictional engagement of face 48a with the ring, results in a force couple tending to bend the body portion 42 and thereby rotate the tab 48 slightly with respect to the engaged portion of the ring (i.e. counterclockwise as viewed in FIG. 4). This tilts the face of the tab toward or beyond a position normal to the inner surface of the body 42 to facilitate unlatching of the clip. To provide reliable securement as well as such convenient release, the angle of face 48a with respect to body 42 preferably is in the range of about 50° to 70°.

By reference to FIGS. 1 and 4, it will be appreciated that the assembly including the clip 40 protrudes only slightly beyond the circle defined by the outer surface of band 20, thereby minimizing interference between the container and adjacent items, such as other containers, and minimizing the space required by the assembly. Also, both exposed ends of the clip are turned inward, thereby avoiding sharp exposed edges and fouling.

The clip 40 conveniently may be applied to the end portion 24 by hand and may be readily replaced if a clip becomes damaged or broken.

The ring 16 may be contracted about a container chime and a cover by any suitable means, such as by a pliers type device having engaging elements designed to engage the ring, as in opening 28, behind the clip 40, and in the opening 32. Other force multiplying or applying devices also may be used.

A tool 60 embodying advantageous features for contracting and securing rings using clips 40 is illustrated in FIGS. 6 and 7. The tool 60 is a toggle linkage device including an engagement block 62, a link 64 and an operating handle 66. The block 62 is provided with a downwardly projecting tooth 68 designed to engage in opening 28, behind the clip 40, as shown in FIG. 7. The underside of block 62 may be curved as at 70, to conform generally to the curvature of ring 16. Forward of tooth 68, the block is formed with a recess 72 to accommodate the clip 40, and forward of recess 72 is a presser section 74 for purposes to be later described. Handle 66 is pivotally joined to block 62, as by pin 76 disposed on an axis above the lower surface of block 62 and thus above tooth 68. Link 64 is pivotally joined to handle 66, as by a pin 78, and is provided with a hook-shaped projection 80 at its distal end for insertion in opening 32 and engagement with the end portion 24, as also shown in FIG. 7.

In utilizing the tool 60 to contract and secure a ring assembly disposed on a container 10, the block 62 is positioned over end portion 26 with tooth 68 inserted in opening 28 behind a clip 40 and with the projection 80 engaged in opening 32. Force is then applied to the handle in the direction of the arrow (counterclockwise as seen in FIG. 7) to contract the ring by the toggle action of link 64 and handle 66. It will be appreciated that the contracting force thus applied to end 26 is transmitted from the handle 66 to block 62 through pin 76 and is applied by the pin in a direction toward end 74 and generally parallel to the periphery of the ring 16. The effective opposing resistance force is applied to block 62 at the point of engagement of tooth 68 with clip 40, in a direction generally parallel to the periphery of ring 16, thereby creating a force couple tending to rotate block 62 clockwise as seen in FIG. 7. Thus, section 74 presses inward on the clip 40 (note the resulting curvature of body 42) and tab 48 automatically is urged into opening 30 as the ring is contracted by the tool 60 to move the tab into registry with the opening.

It will be noted that the forward or outer surface 48b of the tab 48 is generally parallel to the face 48a and thereby provides a ramp or cam surface to raise the tab end of the clip over the band 20 as the ring is contracted.

It will be obvious that other modifications of the specific embodiment shown may be made without departing from the spirit and scope of this invention. For example, a pliers type tool may be provided with one jaw to engage in opening 32 and with an element such as block 62 pivotally mounted on the opposite jaw, for contracting rings 16 and applying clips 40. Further, a number of clips may be supplied in a cartridge for automatic sequential feed to the applicator tool for successive applications.

It will thus be seen that an improved arrangement has been provided for applying and securing clamping rings on containers. Reliable securement is obtained in a simple closure operation utilizing a simple one-piece clip. The clips of this invention are very inexpensive to produce and are simply and economically applied to the rings. While these clips are reuseable, they also are readily replaceable thereby permitting use of new clips for each use of the rings, if desired, and permitting ready replacement of any lost or damaged clips. Further, this assembly may be closed and secured with a tool which is independent of the clamping ring, thereby eliminating all of the costs and inconvenience attendant to providing a closure mechanism on each ring. This assembly results in minimum extension of the securing assembly beyond the periphery of the container and avoids snagging and fouling of adjacent units. Further, in the event the clip is unlatched by unauthorized personnel, the ring assembly is very difficult to reclose and latch without a specially adapted tool, thereby providing a telltale of unauthorized tampering. An improved tool is also provided for applying ring assemblies and automatically latching the clips.

While a particular embodiment of this invention is illustrated and described herein, it will be understood of course that the invention is not to be limited thereto since many modifications may be made by those skilled in the art, particularly in light of the foregoing teachings.

We claim:

1. A unitary spring clip adapted for use in securing the ends of a clamping ring comprising a body portion, an end portion extending from one end of said body portion and being disposed in generally parallel opposed relation to said body portion for clamping engagement with a ring interposed therebetween, a reverse bent tab portion extending from the opposite end of said body portion, said tab portion extending laterally of said body portion and defining an acute angle therewith, and a tail section extending from said tab portion.

2. A unitary spring clip as in claim 1 wherein the angle of said tab with respect to said body portion falls within the range from about 50° to about 70°.

3. A unitary spring clip as in claim 1 wherein said tail section includes a portion curved in the direction of extension of said tab.

4. A clamping ring assembly including a clamping ring having first and second ends, said ring being formed with an opening adjacent said first end, and a clip having a hook formed at one end and extending through said opening, a body portion extending from said first end toward said second end, and a latch tab extending laterally from a distal portion of said clip at an acute angle to said body portion, and said clamping ring having means on said second end for cooperative latching engagement with said tab.

5. A clamping ring assembly including a clamping ring having first and second ends, said ring being formed with an opening adjacent said first end, and a clip having a hook formed at one end and extending through said opening, said clip extending from said first end toward said second end and including a latch tab extending laterally from a distal portion of said clip, said clip including a tail portion extending beyond said latch tab, said tail portion being curved in the direction of extension of said tab, and said clamping ring having means on said second end for cooperative latching engagement with said tab.

6. A lever type tool adapted for contracting and latching a contractable ring having first and second ends, comprising first means to grip such first end, second means adapted to grip such second end, a lever element joined to said first and second means and adapted to move said second means toward said first means, and means actuated by said lever element as said first and second means are moved together in contracting a clamping ring to urge a clip into latching engagement with said ring, wherein said first means includes a link having a ring engaging element at one end and being pivotally joined to said lever element at its opposite end, and said second means includes an element pivotally mounted on said lever element and adapted to extend toward said one end of said link when in use and having a ring engaging extension on the side thereof remote from said actuating lever.

References Cited

UNITED STATES PATENTS

| | | |
|---|---|---|
| 188,506 | 3/1877 | Fisher. |
| 720,308 | 2/1903 | Wood. |
| 987,230 | 3/1911 | Hoover. |
| 1,965,207 | 7/1934 | Walker. |
| 2,846,016 | 8/1958 | Hanes. |

FOREIGN PATENTS

| | | |
|---|---|---|
| 332,385 | 2/1921 | Germany. |

DONALD A. GRIFFIN, Primary Examiner

U.S. Cl. X.R.

81—9.3; 292—256.69